United States Patent [19]

Russell et al.

[11] Patent Number: 5,388,882
[45] Date of Patent: Feb. 14, 1995

[54] TARP ASSEMBLY FOR CONTAINER TRUCKS

[75] Inventors: William S. Russell, Lakeland; Hoyt B. Willaford, Plant City, both of Fla.

[73] Assignee: HarDee Manufacturing Co., Inc., Plant City, Fla.

[21] Appl. No.: 85,978

[22] Filed: Jun. 30, 1993

[51] Int. Cl.⁶ .................................................. B60P 7/02
[52] U.S. Cl. ........................................ 296/98; 296/100
[58] Field of Search .................................. 296/98, 100

[56] References Cited

U.S. PATENT DOCUMENTS

| | | | |
|---|---|---|---|
| 3,515,428 | 6/1970 | Killion | 296/98 |
| 4,023,857 | 5/1977 | Killion | 296/98 |
| 4,050,734 | 9/1977 | Richard | 296/98 |
| 4,082,347 | 4/1978 | Petretti | 296/98 |
| 4,341,416 | 7/1982 | Richard | 296/98 |
| 4,516,802 | 5/1985 | Compton | 296/98 |
| 4,893,864 | 1/1990 | Bailey | 296/98 |
| 4,981,317 | 1/1991 | Acosta | 296/98 |
| 5,129,698 | 7/1992 | Cohrs et al. | 296/98 |
| 5,174,625 | 12/1992 | Gothier et al. | 296/98 |
| 5,211,440 | 5/1993 | Cramaro | 296/98 |
| 5,275,459 | 1/1994 | Haddad, Jr. | 296/98 X |
| 5,292,169 | 3/1994 | O'Brian | 296/98 |

*Primary Examiner*—Joseph Pape
*Attorney, Agent, or Firm*—Dominik, Stein, Saccocio, Reese, Colitz & VanDerWall

[57] ABSTRACT

A tarp assembly for container trucks comprising a roll-up assembly that is mounted to the top of a fixed-height gantry framework, the gantry framework being welded to the frame of the truck in front of the tilt frame of the truck. A manual crank assembly is mounted to a bracket extending from a lower portion of the gantry framework and is operatively connected to the shaft of the roll-up assembly by a continuous chain and sprockets.

9 Claims, 5 Drawing Sheets

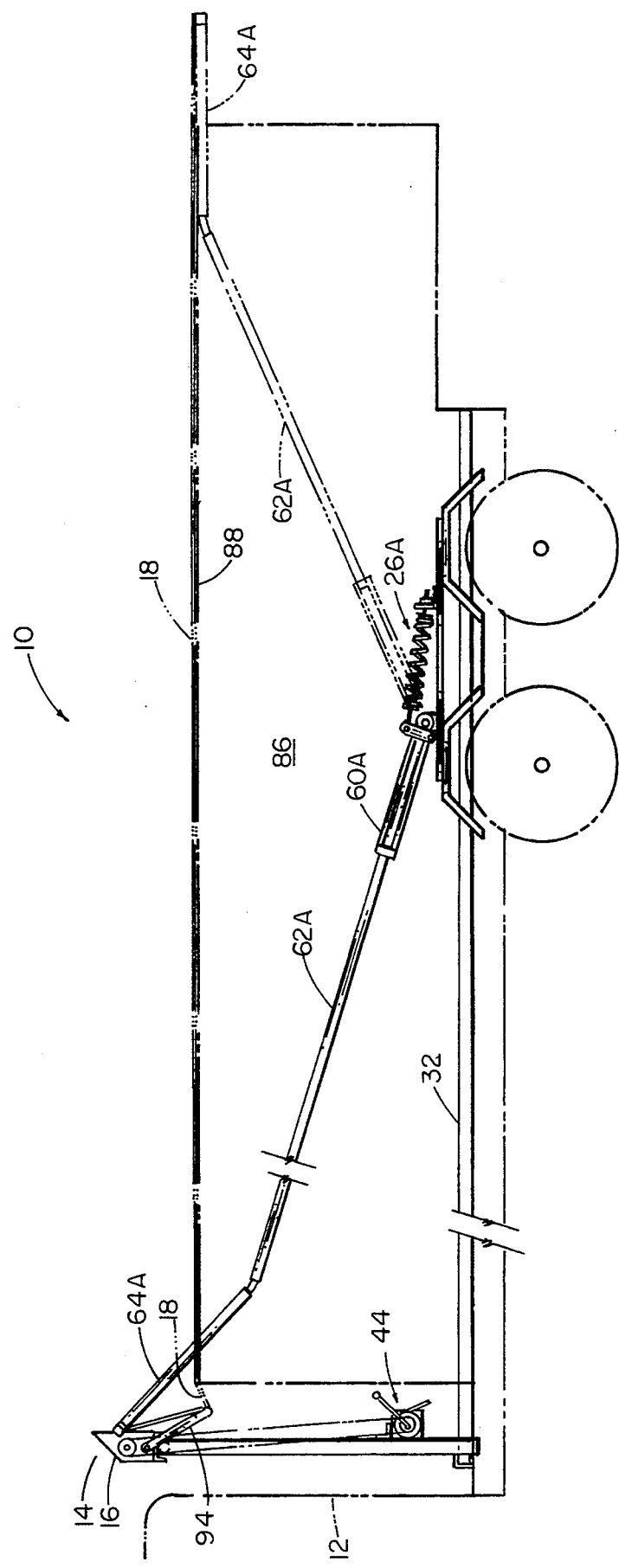

TARP ASSEMBLY FOR CONTAINER TRUCKS

BACKGROUND OF THE INVENTION

1. Field of the Invention

This invention relates to a tarp assembly for covering the load bed of a truck. More particularly, this invention relates to a tarp assembly for extending a tarp over a container positioned on a roll-off bed of a container truck during transport and for retracting the tarp to permit the container to be rolled off the bed of the truck and an empty container loaded thereon.

2. Description of the Background Art

Presently there exist many types of tarp assemblies designed to position a tarp over the load bed of a truck to prevent materials being blown or jostled from the load bed onto the highway. Most jurisdictions require such tarp systems for the safety of passenger vehicles from flying materials.

Tarp assemblies typically comprise a tarp that is wound onto a tarp roll-up bar. The tarp roll-up bar is journalled to the front of the load bed of the truck. The end of the tarp is connected to a rear cross bar connected between a pair of arms that pivotably extend from the sides of the truck bed. Rearward extension of the arms unroll the tarp from the roll-up bar thereby extending it over the opened top of the load bed. Materials are therefore prevented from being blown or jostled from the load bed onto the highway.

Tarp assemblies are usually manually operated, electrically operated or hydraulically operated. Manually operated tarp assemblies often include a pair of spring mechanisms that are operatively connected to the pivoting ends of the arms to tension the arms rearwardly to unroll the tarp from the roll-up bar over the load bed. A manual crank is connected to the tarp roll-up bar such that upon cranking, the tarp is wound back onto the roll-up bar to a retracted position clear of the load bed of the truck. The roll-up bar is then locked to prevent unrolling of the tarp from the roll-up bar due to the tension of the spring assemblies. Electrically operated tarp assemblies have a similar construction with an electric motor operatively connected to the roll-up bar in lieu of the manual crank.

Hydraulically operated tarp assemblies commonly employ a spring-loaded roll-up bar that exerts tension on the tarp to roll-up the tarp onto the roll-up bar. In lieu of spring assemblies, hydraulic assemblies are operatively connected to the pivoting ends of the arms. When actuated rearwardly, the hydraulic assemblies extend the arms rearwardly to unroll the tarp from the roll-up bar over the load bed. When the hydraulic assemblies are actuated forwardly, the arms are retracted over the load bed of the truck as the spring-loaded roll-up bar rolls up the tarp. See for example, U.S. Pat. No. 5,058,956.

The majority of the tarp assemblies are installed on dump trucks with the roll-up bar being mounted to the cab shield of the load bed and the ends of the paired arms being connected to the lower sides of the load bed. In this manner, the load bed together with the tarp assembly may be pivoted upwardly to dump the material from the load bed.

It is also known to utilize hydraulically operated tarp assemblies in connection with container trucks designed to haul 20 or 40 cubic yard containers on a roll-off bed of the truck. In these tarp assemblies, the roll-up bar is mounted to a gantry framework mounted to the truck frame in front of the tilt frame of the roll-off bed. The ends of the paired arms and the hydraulic assemblies are mounted to the sides of the truck frame away from the sides of the tilt frame. In this manner, the paired arms of the tarp assembly may be extended rearwardly to pull the tarp to cover the opened top of a container positioned on the roll-off bed of the truck thereby preventing material in the container from blowing onto the highway during transport. After transport, the paired arms may be retracted fully forward and the tilt frame tilted upwardly to roll-off the container filled with the material and to load an empty container onto the roll-off bed.

It is noted that 40 cubic yard and 20 cubic yard containers are commonly used throughout the industry. The height of the 40 cubic yard containers is significantly higher than 20 cubic yard containers. Hence, the gantry framework is usually positioned substantially level with the top of a conventional 20 cubic yard container and is made to be upwardly adjustable by means of a hydraulic cylinder to be substantially level with the top of a conventional 40 cubic yard container. The adjustability of the gantry framework is required in order for the tarp assembly to fully cover 20 and 40 cubic yard containers without the wind catching under the tarp during transport and blowing the materials from the container onto the highway. Unfortunately, the upward adjustability of the gantry framework substantially increases the complexity and resulting cost of manufacture and installation of the tarp assembly.

The above-described hydraulically operated tarp assembly for container trucks has not been widely accepted in the trade due to the expense of utilizing the hydraulic cylinders for the gantry framework and the hydraulic cylinders in the hydraulic assemblies. Hence, there presently exists a need in the industry for more affordable tarp assemblies for container trucks that may be easily retrofitted to existing container trucks.

Therefore, it is an object of this invention to provide a tarp assembly that overcomes the aforementioned inadequacies of the prior art tarp assemblies and provides an improvement that is a significant contribution to the advancement of the tarp assembly art.

Another object of this invention is to provide a tarp assembly for a container truck that is operable without the need for hydraulic cylinders and associated controls.

Another object of this invention is to provide a tarp assembly for a container truck that is less complex and therefore more affordable.

Another object of this invention is to provide a tarp assembly for a container truck that is easily retrofitted to existing container trucks without special expertise.

Another object of this invention is to provide a tarp assembly for a container truck that includes a fixed-height gantry framework that still allows the tarp to cover conventional 20 and 40 cubic yard containers.

Another object of this invention is to provide a tarp assembly having a fixed-height gantry framework and a pivotable hold-down bar that forces the front area of the tarp downwardly over the front edge of a smaller sized (e.g., 20 cubic yards) container thereby preventing wind from catching under the front of the tarp and blowing it upwardly away from the rim of the container.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a tarp assembly for container trucks. More specifically, the tarp assembly of this invention comprises a roll-up assembly that is mounted to the top of a fixed-height gantry framework. The gantry framework is welded to the frame of the truck in front of the tilt frame of the truck. A manual crank assembly is mounted to a bracket extending from a lower portion of the gantry framework and is operatively connected to the shaft of the roll-up assembly by a continuous chain and sprockets.

A tarp is wound onto the roll-up assembly. The leading end of the tarp is connected to a rear cross bar. The rear cross bar extends across the width of the truck. The cross bar is connected between the upper ends of a pair side arms. The side arms extend from opposing sides of the truck. The lower ends of the side arms are respectively pivotably connected to a bracket mounted to the top of the side fenders of the truck.

A pair of spring assemblies is mounted at one end to the bracket mounted to the top of the side fenders of the truck and at its other end to the side arms. The spring assemblies constantly urge the arms to extend rearwardly. Rearward extension of the side arms pull the tarp from the roll-up assembly over the opened top of a conventional 20 or 40 cubic yard container positioned on the tilt frame of the truck. Thus, the spring assemblies keep the tarp taut over the opened top of the container.

It is noted that the height of the fixed-height gantry framework is approximately half-way between the height of the top of a conventional 20 cubic yard container and the top of a 40 cubic yard container. A pivotable hold-down bar is positioned immediately behind the roll-up assembly and extends across the width of the tarp but inside of the side arms. The hold-down bar is movable downwardly against the tarp in front of the container to force the tarp to bend over and completely cover the front edge of the container. In this manner, wind cannot catch the underside of the tarp and force the tarp upwardly away from the container. Hence, the gantry framework need not be adjustable in order to fit different sized containers.

A primary feature of this invention is the utilization of the hold-down bar that eliminates the need for the more complex and costly adjustable-height gantry assemblies. Hence, the tarp assembly of the present invention is more affordable to purchase and may be more easily retrofitted to existing container trucks without special expertise.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a side view of the tarp assembly of the invention retrofitted to a container truck, similar to FIG. 4, but with tarp extending over a conventional 20 cubic yard container, illustrating the hold-down bar forcing the tarp to fold over the front edge of the container so that wind cannot catch under the tarp and force it away from the upper edges of the container.

Similar reference characters refer to similar parts throughout the several views of the drawings.

DETAILED DESCRIPTION OF THE PREFERRED EMBODIMENT

Figure 1:
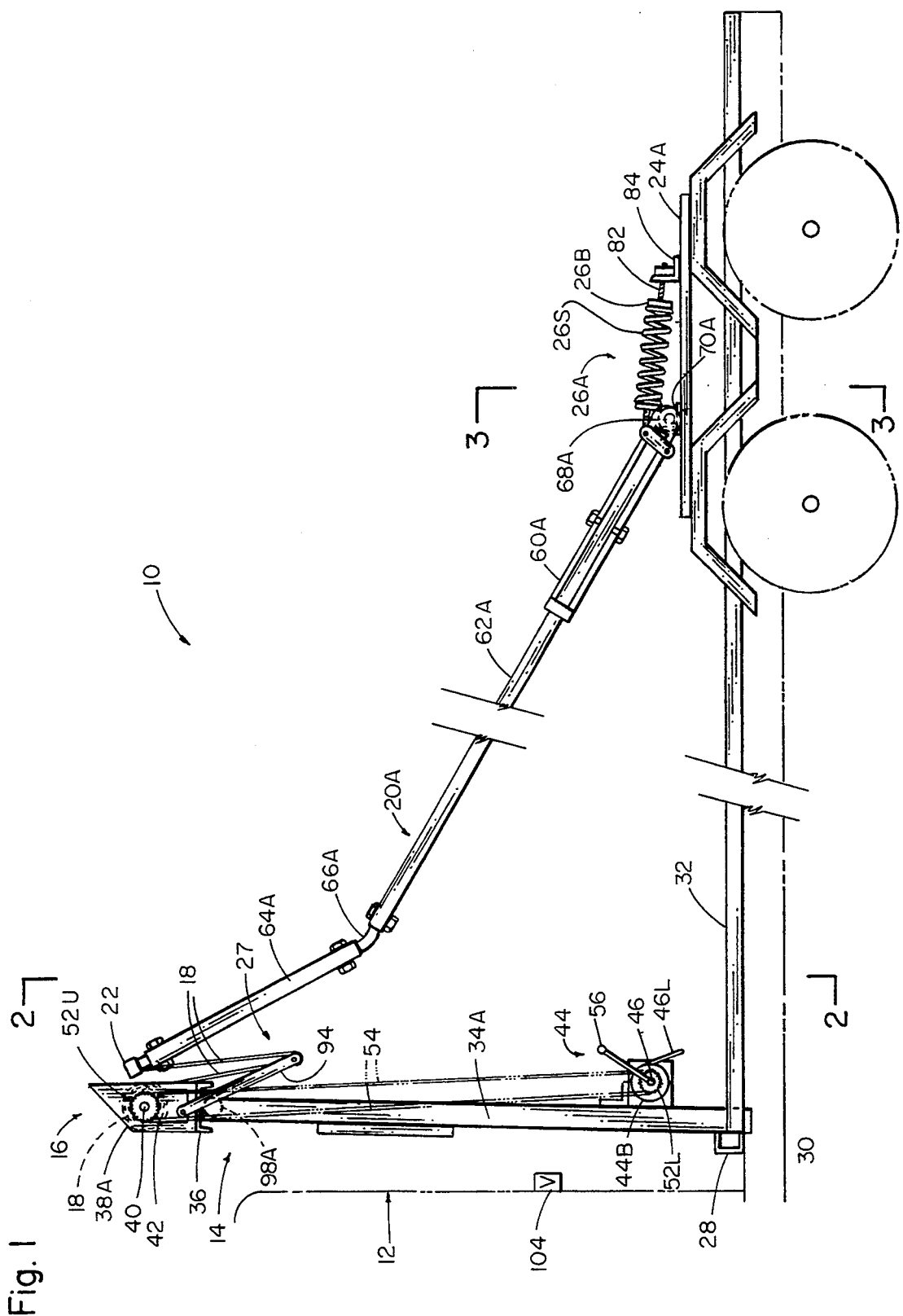
FIG. 1 is a side view of the tarp assembly of the invention retrofitted to a container truck.
Figure 2:
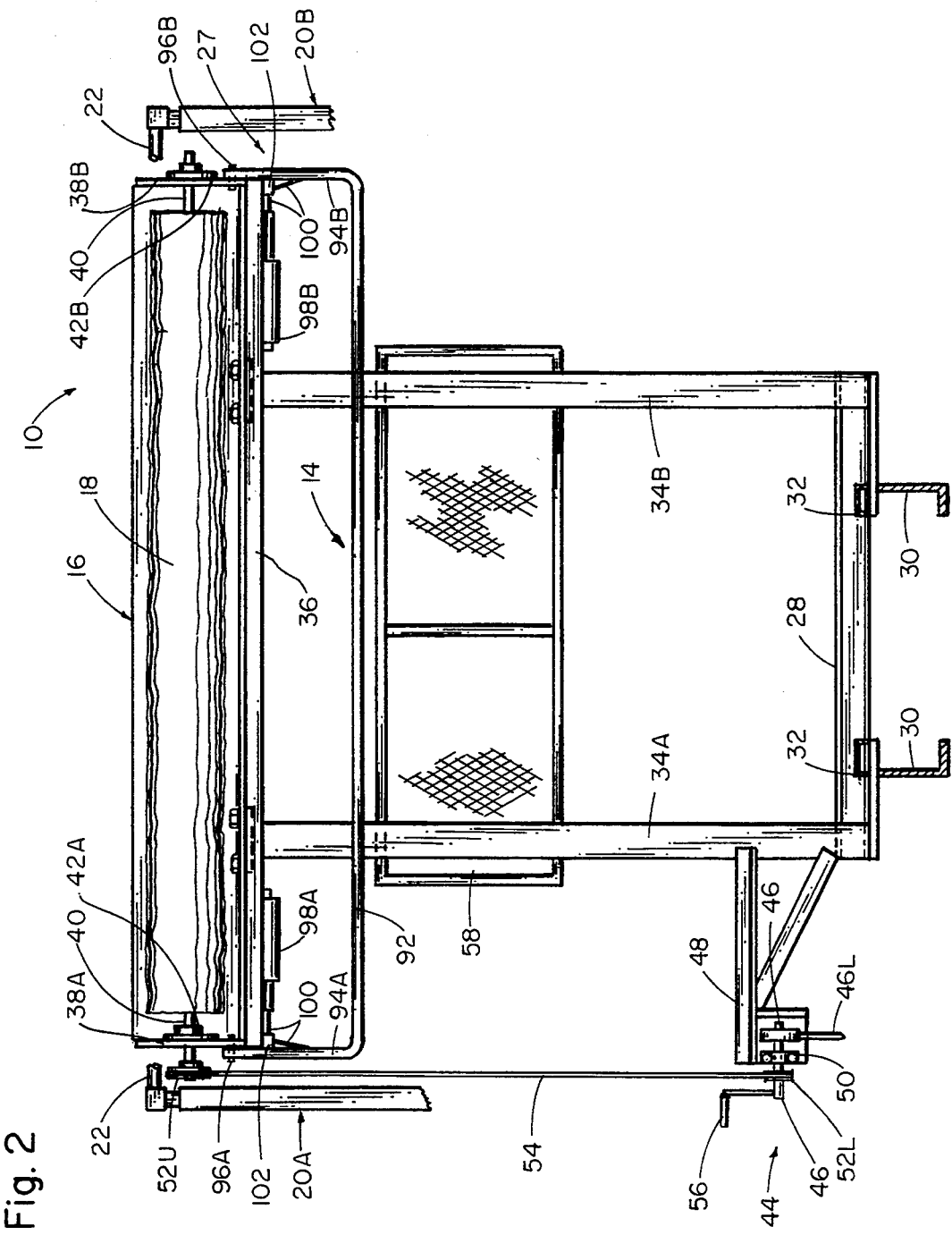
FIG. 2 is cross-sectional view of FIG. 1 along lines 2—2 (the tarp being disconnected from the cross bar and rolled up onto the shaft for clarity) illustrating the gantry framework to which is mounted the roll-up assembly.

Referring to FIGS. 1 and 2, the tarp assembly 10 of the invention is intended to be connected to a conventional container truck 12. The tarp assembly 10 of the invention comprises in general terms a gantry framework 14, a roll-up assembly 16, tarp 18, and paired side arms 20A and 20B having a cross bar 22 connected between the upper ends thereof and the lower ends thereof being pivotably connected to the truck 12 by means of paired fender brackets 24A and 24B. Paired spring assemblies 26A and 26B are connected between the side arms 20A and 20B and the fender brackets 24A and 24B to constantly urge the side arms 20A and 20B rearwardly. A hold-down bar 27 is provided to hold down the tarp 18 over the front edge of the container during transport. Pivot and spring can also be attached by welding directly to hoist tilt frame 32.

More particularly, as best shown in FIG. 2, the gantry framework 14 comprises a horizontal frame member 28 rigidly welded to the truck front of the hoist sub frame 32 of the truck 12. Paired vertical frame members 34A and 34B are rigidly welded to the ends of the horizontal frame member 28.

The roll-up assembly 16 is rigidly bolted to the upper ends of the paired vertical frame members 34A and 34B. The roll-up assembly 16 comprises a base plate 36 with upstanding paired end plates 38A and 38B. A shaft 40 is rotatably positioned between openings in the paired end plates 38A and 38B by means of paired journal bearings 42A and 42B. The end of the tarp 18 is connected to the shaft 40 and then wound-up onto the shaft 40.

A crank mechanism 44 is provided for cranking the shaft 40 in rotation. The crank mechanism 44 comprises a crankshaft 46 connected to a bracket 48 extending from one side of the left vertical frame member 34A or 34B by means of a journal bearing 50. A spring-loaded brake 49 is fitted to the crankshaft 46.

Upper and lower sprockets 52U and 52L are attached to the ends of the shaft 40 of the roll-up assembly and the crankshaft 46 in alignment with each other. A continuous chain 54 or other flexible member is connected about the sprockets 52.

The crank mechanism 44 further includes a crank handle 56 that is removably connected to the outermost end of the crankshaft 46. Manual rotation of the crank handle 56 causes the shaft 40 of the roll-up assembly 16 to rotate thereby rolling up the tarp 18 onto the shaft 40. The brake 49 is designed so as to apply constant braking pressure against the crankshaft 46 such that crankshaft 46 is permitted to rotate to unwind the tarp 18 from the roll-up assembly only when release pressure is being applied to its release lever 46L. Preferably, crank mechanism 44 comprises GL-7000 Series, Part Number 1500, manufactured by Donovan Enterprises, Inc. of 2951 S. E. Dominica Terrace, Stuart, Fla.

It is noted that a window guard plate 58 may be bolted to the paired vertical supports 34A and 34B to protect the window of the cab from accidental breakage.

Figure 3:
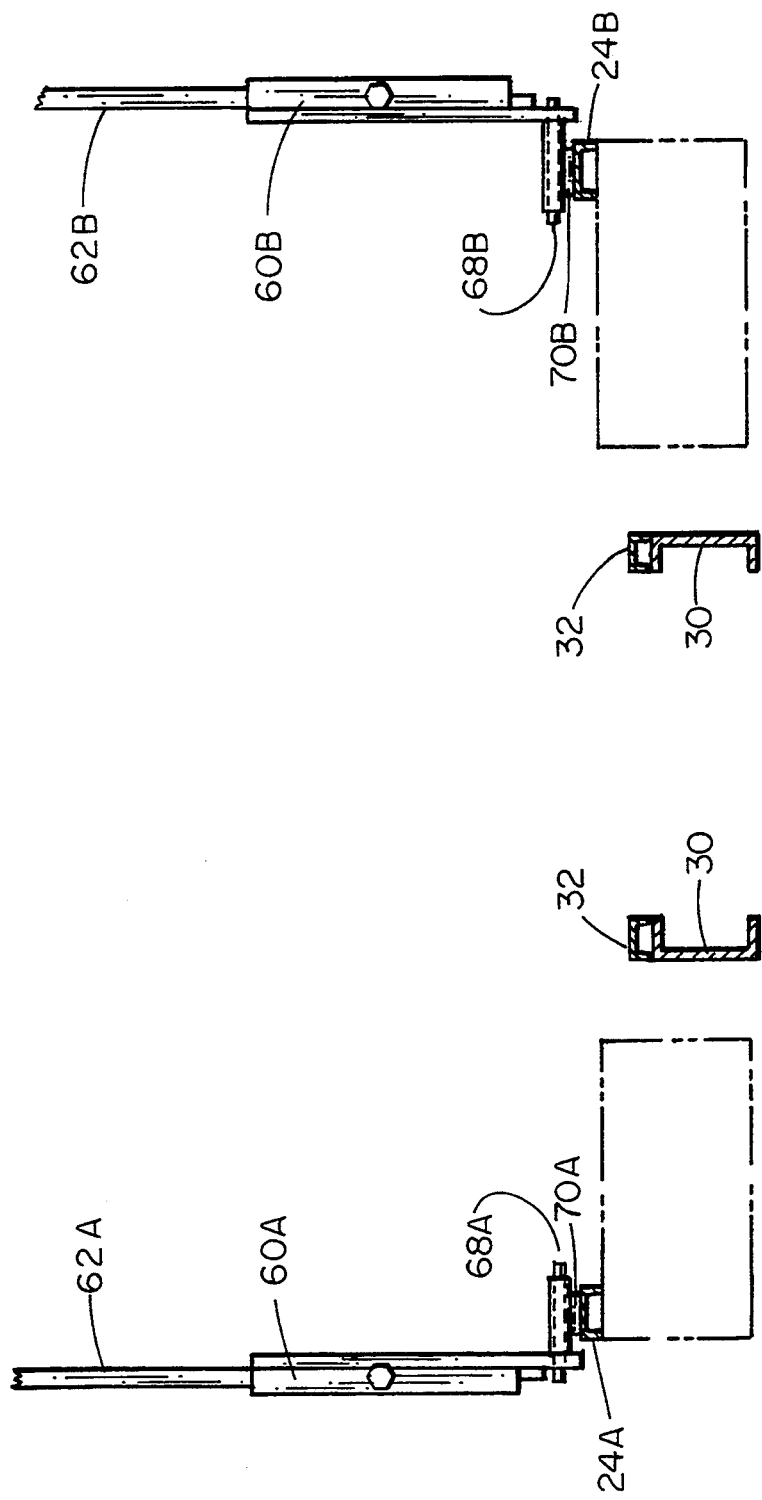
FIG. 3 is cross-sectional view of FIG. 1 along lines 3—3 illustrating the bracket connected to the truck fenders to which is mounted the spring assemblies.

As best shown in FIG. 3 in combination with FIG. 1, the paired side arms 20A and 20B each comprise a square-shaped lower tube 60A and 60B into which is positioned a first elongated square tube 62A and 62B. Second elongated square tube 64A and 64B is connected end-to-end with the first elongated tube 62A and 62B by means of an angled square rods 66A and 66B. The cross bar 22 is rigidly connected to the uppermost ends of the second rods 64A and 64B. The tube and rod components are preferably connected together by means of bolts or quick release fittings so that they may be replaced in the event of damage.

The lowermost ends of each of the lower tubes 60A and 60B are pivotably connected to the fender brackets 24A and 24B by means of pivot shafts 68A and 68B welded to the support brackets 70A and 70B that are in turn welded to the fender brackets 24A and 24B. The pivot shafts 68A and 68B allow the side arms 20A and 20B to pivot forwardly and rearwardly.

The spring assemblies 26A and 26B preferably each comprise a coil spring 26S having a plug 26P with a threaded hole inserted into the end thereof. Threaded rods 82 are threaded into the plugs 26P. Spring assemblies 26 of this nature are custom manufactured by Kokomo Spring Company, Inc. of 329 East Firmin Street, Kokomo, Ind.

The spring assembly 26 is pivotably connected to a lower portion of the arm 60A and the other end 82 is connected to a bracket 84 welded to the fender brackets 24A and 24B. It is noted that this spaced apart positioning of the side arms 20A and 20B is sufficiently wide so as to allow a conventional container 86 to be rolled-up onto the tilt frame 32 of the truck 12 and the tilt frame 32 lowered to rest upon the truck frame 30 itself without ever contacting the side arms 20A and 20B.

Figure 4:
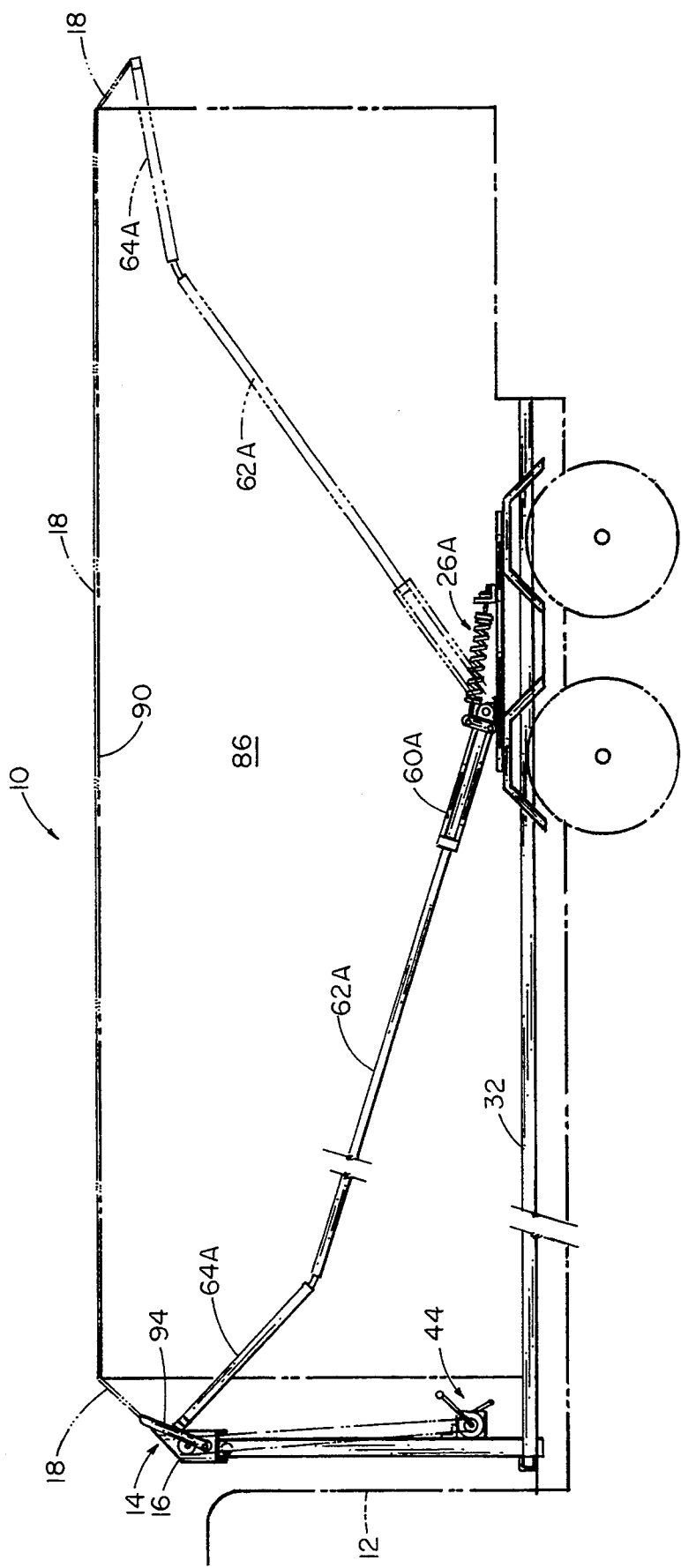
FIG. 4 is a side view of the tarp assembly of the invention retrofitted to a container truck illustrating the paired arms in a retracted position fully forward and illustrating in phantom the paired arms in an extended position fully rearward with the tarp extending over a conventional 40 cubic yard container.

As shown in FIGS. 4 and 5, the height of the gantry framework 14 is such that the roll-up assembly 16 is positioned approximately half-way between the top 88 of a conventional 20 cubic yard container 86 and the top 90 of a conventional 40 cubic yard container 86. The hold-down assembly 27 is provided to assure that the tarp 18 is forced downwardly over the front edge of the top 88 of the cubic yard container 20 (or other shorter-height containers). The hold-down assembly 27 comprises a hold-down bar 92 extending across the full width of the tarp 18. The hold-down bar 92 is rigidly connected between paired side arms 94A and 94B. The side arms 94 are pivotably connected to opposing end plates 38 of the roll-up assembly 16 at pivots 96A and 96B. A pair of air cylinders 98A and 98B are rigidly connected at one of their ends to the underside of the base plate 36 of the roll-up assembly 16. The other ends are respectively connected to cables 100 that are threaded through pulleys 102 and then rigidly connected to the side arms 94A and 94B. The air cylinders 98 are connected in parallel to the trucks 12 air system so that they operate in tandem. A valve 104 is provided for controlling airflow via air lines (not shown) to and from the air cylinders 98A and 98B. It is noted that the length of the side arms 94 are such that the hold-down bar 92 extends immediately in front of the container 86 and, upon contraction of the air cylinders 98, is forced downwardly in front of and below the front of the container 86. In this manner, the tarp 18 is held over the front edge of the container 86 and the wind cannot catch under it and blow it upwardly during transport.

During operation, the truck driver or other operator, grasps the release lever 46L of the crank mechanism 44 and applies sufficient release pressure on the brake 44B to permit the shaft 40 to rotate, thereby permitting the tarp 18 to unroll therefrom. The side arms 20A and 20B are moved by the force of the spring assemblies 26 from their retracted position as shown in FIGS. 4 or 5 to their extended position as shown in phantom in FIGS. 4 or 5 to thereby pull the tarp 18 from the roll-up assembly 16 over the opened top 88 or 90 of the container 86. As shown in FIG. 5, when the container 86 comprises a 20 cubic yard container or other container that is equal to or lower than the height of the roll-up assembly 16, the valve 104 is actuated to force the hold-down bar 92 downwardly thereby forcing the tarp 18 to fold over the front edge of the container 86.

When the container 86 is to be unloaded from the tilt frame 32 of the truck 12, the air pressure in the air cylinders 98 is released via valve 104. The tarp 18 may then simply be rewound onto the shaft 40 of the roll-up assembly 16 by means of the crank 56 of the crank mechanism 44. The container 86 may then be removed from the truck 12 and an empty container 86 loaded thereon.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to-without departing from the spirit and scope of the invention.

Now that the invention has been described,

What is claimed is:

1. A tarp assembly for covering the opened end of a container on a truck, comprising in combination:
   - a gantry framework having an upper portion that is higher than the height of the container;
   - means for fixedly connecting said gantry framework to the truck at a position in front of the container;
   - a tarp having a size sufficient to cover the opened end of the container;
   - a roll-up assembly including a shaft on which said tarp is to be roll-up;
   - means for connecting said roll-up assembly at said upper portion of said gantry framework;
   - paired side arms including a cross bar between upper ends thereof, an end of said tarp being coupled to said cross bar;
   - means for pivotably connecting said paired side arms to opposing sides of the truck such that said cross bar extends over the container and draws said tarp over the container when said side arms are pivoted rearwardly;
   - means for urging said side arms rearwardly;
   - means for holding said tarp downwardly over the front edge of the container; said means comprising a hold-down assembly pivotably connected to said gantry framework; and
   - means for cranking said tarp onto said shaft against the force exerted by said urging means.

2. The tarp assembly as set forth in claim 1, wherein said hold-down assembly pivotably connected to said upper portion of said gantry framework.

3. The tarp assembly as set forth in claim 2, wherein said hold-down assembly comprises paired side arms and a hold-down bar extending therebetween.

4. The tarp assembly as set forth in claim 3, wherein said paired side arms of said hold-down assembly are pivotably connected to said upper portion of said gantry framework.

5. The tarp assembly as set forth in claim 4, wherein said hold-down assembly further comprises means for being forcibly moved downwardly.

6. The tarp assembly as set forth in claim 5, wherein said force means comprise at lease one air cylinder operatively connected to a source of air and coupled to one of said side arms of said hold-down assembly such that upon air being supplied to said air cylinder, said hold-down bar moves downwardly.

7. The tarp assembly as set forth in claim 6, including two of said air cylinders respectively interconnected to said side arms of said hold-down assembly by two of said interconnecting means.

8. The tarp assembly as set forth in claim 7, wherein said cranking means comprises a crank mechanism having a brake to prevent unintended unwinding of said tarp from said shaft of said roll-up assembly.

9. The tarp assembly as set forth in claim 1, wherein said paired side arms are disassemblable to facilitate repair.

* * * * *